E. MOREWOOD & J. H. ROGERS.
APPARATUS FOR TINNING OR COATING METALS.
No. 178,657.  Patented June 13, 1876.
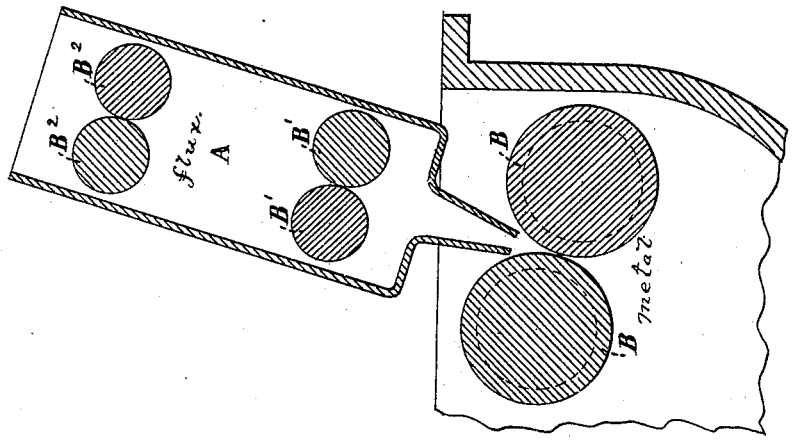
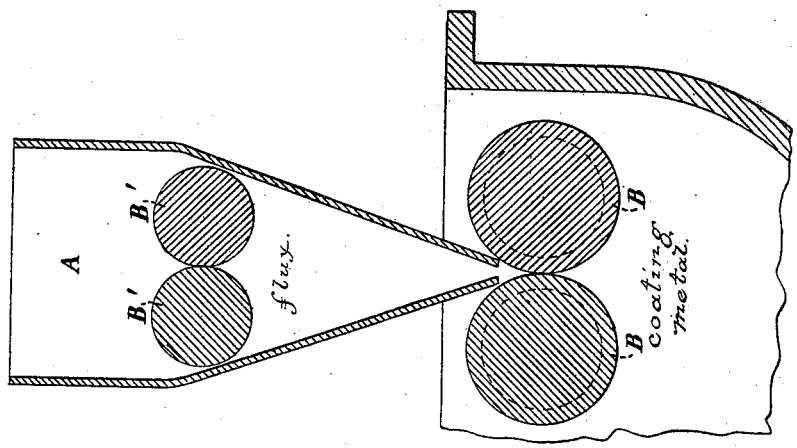

UNITED STATES PATENT OFFICE.

EDMUND MOREWOOD, OF LLANELLY, AND JOHN H. ROGERS, OF LLANGEN-NECH PARK, NEAR LLANELLY, ENGLAND.

IMPROVEMENT IN APPARATUS FOR TINNING OR COATING METALS.

Specification forming part of Letters Patent No. 178,657, dated June 13, 1876; application filed December 30, 1875.

*To all whom it may concern:*

Be it known that we, EDMUND MOREWOOD, of Llanelly, and JOHN HENRY ROGERS, of Llangennech Park, near Llannelly, both in the county of Carmarthen, England, have invented certain Improvements in Apparatus to be used in Tinning or Coating Metals; and the following is declared to be a full and correct description of the same.

The main objects of this invention are to cause the plates in process of coating to be a considerable time in the flux, and to enter the flux at a point where the flux is comparatively cool, and in its travel to be exposed to flux of a gradually-increasing temperature, in order that the plate may thereby be not only properly greased, but also have acquired such a heat as to enable it to take the coating-metal soundly and quickly.

With this view we make use of a deep and comparatively narrow flux-box on the entering side of the coating-pot, and arrange rollers therein, and as shown on the accompanying drawings, of which—

Figure 1 is a vertical cross-section of the improved flux-box, and Fig. 2 is a section of the flux-box with two pairs of rollers.

Practically, we find that the ebullition of the hot flux caused by the entry of the damp plate delays the downward passage of the plate into the nip of the coating-rollers B.

In order, however, to cause the plate to be evenly drawn through the upper part of the flux-box, instead of being merely passed through this part by hand, we prefer to employ special drawing or propelling rollers B' in the flux-box itself, as shown in the drawing, and as described and shown in the specification of our British Patent dated 24th December, 1873, No. 4,242.

A contingent and important advantage resulting from the use of such rollers, especially if more than one pair are employed, is that we are enabled to use a much deeper flux-box, and thus more fully accomplish the objects herein stated. The flux-box is widened in order to make room for this pair of rollers. B B, Fig. 2, are a first pair of drawing-rollers below the flux-box.

In Fig. 2 two such pairs of rollers, $B^2 B^2$ and $B^1 B^1$, are employed, the shape of the flux-box being altered to suit. By this arrangement of two or more pairs of rollers in the flux-box, we are enabled to cause the plate to travel evenly through a great depth of flux, and as the upper portion is cool and solid, and the temperature is gradually increasing toward the bottom, the plate is much better prepared to receive the metal coating than by the arrangements shown in our United States Patent No. 172,148.

A flux-box containing a pair of rollers is shown in the United States Patent of E. Morewood, No. 57,832, September 10, 1866, but the box has parallel sides extending down into the coating-metal; hence the flux is exposed to undue heat. In the present instance the flux-box is made with a narrow mouth at the bottom, so as to separate it from the melted metal as much as possible, and the rollers are introduced to regulate the speed of movement of the sheet in the flux.

We claim as our invention—

The flux-box A above the pair of coating-rollers B, and made with a narrow mouth, so as to protect the flux from the heat of the melted coating-metal, in combination with one or more pairs of rollers within said flux, for moving the plates to be coated at the required speed, as set forth.

EDMUND MOREWOOD.
J. H. ROGERS.

Witnesses:
J. BEAVAN PHILLIPS,
   *Bank, Llanelly.*
B. WILLIAMS,
   *Servant to M. B. Jones, Llanelly.*